(12) United States Patent
Gao et al.

(10) Patent No.: US 10,186,128 B2
(45) Date of Patent: Jan. 22, 2019

(54) SELF-CHECKOUT ANTI-THEFT SYSTEMS AND METHODS

(71) Applicants: Lin Gao, Syosset, NY (US); Yilin Huang, Fuzhou (CN)

(72) Inventors: Lin Gao, Syosset, NY (US); Yilin Huang, Fuzhou (CN)

(73) Assignee: QUEUEHOP, INC., San Jose, CA (US)

( * ) Notice: Subject to any disclaimer, the term of this patent is extended or adjusted under 35 U.S.C. 154(b) by 0 days.

(21) Appl. No.: 15/658,806

(22) Filed: Jul. 25, 2017

(65) Prior Publication Data

US 2018/0025601 A1 Jan. 25, 2018

Related U.S. Application Data

(60) Provisional application No. 62/366,602, filed on Jul. 25, 2016.

(51) Int. Cl.

| G08B 13/24 | (2006.01) |
|---|---|
| G06Q 20/18 | (2012.01) |
| G06K 7/14 | (2006.01) |
| G06K 7/10 | (2006.01) |
| G07G 1/00 | (2006.01) |
| G07G 3/00 | (2006.01) |
| G06Q 20/20 | (2012.01) |

(52) U.S. Cl.
CPC ....... *G08B 13/246* (2013.01); *G06K 7/10366* (2013.01); *G06K 7/1413* (2013.01); *G06K 7/1417* (2013.01); *G06Q 20/18* (2013.01); *G06Q 20/203* (2013.01); *G07G 1/0081* (2013.01); *G07G 3/003* (2013.01)

(58) Field of Classification Search
CPC ............. G06K 7/10366; G06K 7/1413; G06K 7/1417; G07G 1/0081; G07G 3/003; G08B 13/246; G06Q 20/18; G06Q 20/203
See application file for complete search history.

(56) References Cited

U.S. PATENT DOCUMENTS

| 2012/0101888 A1* | 4/2012 | Rothschild | G06Q 30/00 705/14.23 |
|---|---|---|---|
| 2013/0118043 A1* | 5/2013 | Favier | G09F 9/35 40/471 |
| 2014/0125800 A1* | 5/2014 | Van Nest | G07G 3/003 348/143 |

(Continued)

*Primary Examiner* — Ojiako K Nwugo
(74) *Attorney, Agent, or Firm* — Bass Berry & Sims PLC (57) ABSTRACT

Disclosed is a system for self-checkout with anti-theft measures. The system comprises: an Electronic Article Surveillance (EAS) device configured to be affixed to a merchandise and uniquely identify the merchandise via at least one visually or wirelessly readable code; an Identification (ID) Code Reader configured to: obtain and process the at least one visually or wirelessly readable code associated with the EAS device, and extract information from one or more databases for facilitating a transaction of the merchandise; and an EAS Unlock Device configured to: detect a payment status of the merchandise indicated in the one or more databases based at least upon the at least one visually or wirelessly readable code associated with the EAS device, and in response to detecting a successful payment of the merchandise indicated in the one or more databases, detach the EAS device from the merchandise.

18 Claims, 8 Drawing Sheets

(56) References Cited

U.S. PATENT DOCUMENTS

| | | | | |
|---|---|---|---|---|
| 2015/0009035 A1* | 1/2015 | Rasband | ................ | G07G 3/003 340/572.3 |
| 2015/0145680 A1* | 5/2015 | Favier | ................ | E05B 73/0017 340/572.9 |
| 2016/0078264 A1* | 3/2016 | Armstrong | ......... | G08B 13/2417 340/572.1 |
| 2016/0260303 A1* | 9/2016 | Strulovitch | ........ | G08B 13/2434 |
| 2016/0364969 A1* | 12/2016 | Casanova | ........... | E05B 73/0047 |

* cited by examiner

| ... | RFID CODE OR SRC CODE | ... | ... | ... | ... | ... | MERCHANDISE ID CODE | ... |
|---|---|---|---|---|---|---|---|---|
| | 01020304050607 | | | | | | XXXXXXX | |

DATABASE 1

SELF-CHECKOUT ANTI-THEFT SYSTEMS AND METHODS

TECHNICAL FIELD

The present disclosure relates generally to the field of Radio Frequency Identification (RFID) self-checkout and anti-theft, and more specifically, to methods and systems utilizing identification (ID) Code Reader Device and related checkout devices, Electronic Article Surveillance (EAS) anti-theft devices and EAS Unlock Devices.

BACKGROUND

As consumers' demand for efficiency increases in this digital era, the checkout process is becoming one of the major inconvenience and difficulty for customers when shopping in retail stores. Long checkout lines are often formed during high foot-traffic times (e.g., holiday seasons). As a result, retailers' sales decrease as customers abandon their shopping carts after waiting in line for too long.

Accordingly, there is a demand for a seamless self-checkout solution that comes integrated with anti-theft technology and improves the brick and mortar shopping experience.

BRIEF SUMMARY OF THE INVENTION

The aspect primarily relates the methodology and related systems behind self-checkout with integrated anti-theft technology.

The self-checkout security systems and method disclosed herein provide an expedient and secure checkout procedure for customers, hence improving physical retail experience by offering convenience and efficiency to both customers and retailers.

In accordance with aspects of the present disclosure, a system for self-checkout with anti-theft measures comprises: an Electronic Article Surveillance (EAS) device configured to be affixed to a merchandise and uniquely identify the merchandise via at least one visually or wirelessly readable code; an Identification (ID) Code Reader configured to: obtain and process the at least one visually or wirelessly readable code associated with the EAS device, and extract information from one or more databases for facilitating a transaction of the merchandise; and an EAS Unlock Device configured to: detect a payment status of the merchandise indicated in the one or more databases based at least upon the at least one visually or wirelessly readable code associated with the EAS device, and in response to detecting a successful payment of the merchandise indicated in the one or more databases, detach the EAS device from the merchandise.

The at least one visually or wirelessly readable code comprises at least one of: a Quick Response (QR), a barcode communication code, a near field communication code, and a Radio Frequency Identification (RFID) communication code. The one or more databases comprise at least one of: a retailer merchandise inventory database, and one or multiple third party databases. The ID Code Reader comprises at least one of: a mobile phone, or a computing device including at least one self-checkout kiosk.

The at least one visually or wirelessly readable code is configured to be bound to the merchandise for: identifying each of a plurality of merchandises with a merchandise identification code in the one or more databases; generating and affixing at least one visually or wirelessly readable code on the EAS device affixed to the merchandise; and linking the merchandise identification code of the merchandise and at least one visually or wirelessly readable code in the one or more databases. The merchandise identification code comprises a series of alphanumeric code, decodable by software application, configured to track merchandise-related information stored in the one or more databases.

Further, each of the ID Code Reader and the EAS Unlock Device is configured to connect with and access the one or more databases to retrieve, update, or modify the payment status of the merchandise in the one or more databases. The EAS Unlock Device comprises: a barcode/QR code reader or an RFID reader configured to identify the at least one visually or wirelessly readable code; a computing device configured to: verify the transaction of the merchandise in the one or more databases based at least on the at least one visually or wirelessly readable code, or transmit the at least one visually or wirelessly readable code to another computing device to verify the transaction of the merchandise in the one or more databases based at least on the at least one visually or wirelessly readable code; and an unlock device configured to detach the EAS device from the merchandise in response to detecting the successful payment of the merchandise indicated in the one or more databases. The payment status of the merchandise is recorded in the one or more databases in response to detecting the successful payment of the merchandise.

Moreover, in accordance with aspects of the present disclosure, a method for self-checkout with anti-theft measures comprises: affixing an Electronic Article Surveillance (EAS) device to a merchandise; uniquely identifying the merchandise via at least one visually or wirelessly readable code associated with the EAS device; obtaining and processing the at least one visually or wirelessly readable code associated with the EAS device by an Identification (ID) Code Reader and extracting information from one or more databases for facilitating a transaction of the merchandise based at least on the at least one visually or wirelessly readable code; detecting, by an EAS Unlock Device, a payment status of the merchandise indicated in the one or more databases based at least upon the at least one visually or wirelessly readable code associated with the EAS device; and in response to detecting a successful payment of the merchandise indicated in the one or more databases, detaching the EAS device from the merchandise by the EAS Unlock Device.

Additionally, in accordance with aspects of the present disclosure, a non-transitory computer readable medium storing thereon computer executable instructions for enabling self-checkout with anti-theft measures, the instructions causing at least one computer to: uniquely identify a merchandise via at least one visually or wirelessly readable code associated with an Electronic Article Surveillance (EAS) device affixed to a merchandise; obtain and process the at least one visually or wirelessly readable code associated with the EAS device to extract information from one or more databases for facilitating a transaction of the merchandise; detect a payment status of the merchandise indicated in the one or more databases based at least upon the at least one visually or wirelessly readable code associated with the EAS device; and in response to detecting a successful payment of the merchandise indicated in the one or more databases, generating and transmitting signals for detaching the EAS device from the merchandise.

BRIEF DESCRIPTION OF THE FIGURES

For a more complete understanding of the example aspects, references are made to the following descriptions taken in connection with the accompanying drawings in which.

The drawings referred to in this description are not to be understood as being drawn to scale except if specifically noted, and such drawings are only exemplary in nature.

DETAILED DESCRIPTION

Disclosed herein are exemplary aspects of RFID self-checkout and anti-theft systems, methods and computer program products. Various aspects of invention will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects of the invention. In one exemplary aspect, a system of this invention may include at least four subsystems: the Binding subsystem, the Checkout subsystem, the Payment subsystem, and the Electronic Article Surveillance (EAS) Disengagement subsystem.

EAS device may primarily be used in this invention in order to prevent theft. As part of this invention, RFID may be embedded in an EAS device in order to identify whether a merchandise has been paid by the EAS Disengagement subsystem. A Binding subsystem may be configured to generate, print, and electronically associate each RFID code with a Short-Range Communication (SRC) medium, including but not limited to Barcode Code, QR code, Near-Field Communication (NFC), Bluetooth and etc. Subsequently, each RFID code or SRC code within the EAS device may be mapped to a merchandise identification (ID) code associated with the merchandise. The RFID code, SRC code, merchandise ID code, along with a plurality of inventory information associated with the merchandise may be stored in a third-party database and/or associated retailer database.

In one example, when a customer is using an ID Code Reader Device to scan the SRC code, the embedded RFID or the merchandise ID via a Checkout subsystem, the ID Code Reader Device may extract a set of information associated with the merchandise from the third-party database and/or associated retailer database based on the merchandise ID code. The set of information may be presented to the customer for review and/or checkout. The set of information may include, but is not limited to, merchandise price, merchandise stock levels, merchandise size, payment instructions, payment status and the like.

Thereafter, the customer may purchase the merchandise through the Payment subsystem. Upon detecting a successful payment, the payment status of the merchandise in the third-party database and/or associated retailer database may be updated accordingly.

The customer may then bring the EAS device attached to each merchandise to an EAS Unlock Device, such that the EAS Disengagement subsystem may be configured to detect the RFID embedded in each EAS device. The EAS Unlock Device may be configured to check for the payment status of the merchandise in the third-party database and/or associated retailer database using the extracted RFID code. Specifically, the EAS Unlock Device may check if the merchandise has been paid by the customer based on the payment status information in the third-party database and/or associated retailer database. The EAS Unlock Device may then unlock the EAS device associated with the merchandise if the merchandise has already been paid for. The EAS Disengagement subsystem may not activate unlock mechanism if the merchandise is still marked as unpaid in the third-party database and/or associated retailer database.

In another example, when a customer is ready to check out, the customer may initiate payment by using, e.g., an in-store computing device that is connected to a communication network, including a third-party database and/or associated retailer database, and a physical payment device such as a mobile computing device (e.g., iPad) or a fixated computing station. A system of sensors, such as weight, infrared, laser or any suitable sensors or detectors, may be attached to each computing device to detect the presence of the customer within a defined detection area in the store (e.g., a designated checkout area), as he or she proceeds with the payment and EAS unlock process. Further, a system of alarms may also be attached to the computing device, such as sound alarm, vibration alarm, wireless alarm signal to alert certain store employees in response to detecting, e.g., a potential theft, customer service request, system malfunction, or transaction failure.

A customer may initiate a checkout process by approaching a computing device and triggering at least one sensor. Specifically, the customer may begin payment by entering his or her payment information into the computing device, with instruments such as credit card, wireless payment and the like. Once payment information is recorded into the computing device, a connection may be established between the computing device and a payment gateway via the communication network for authorizing the commencement of the transaction and the EAS Unlock Device may be activated accordingly.

The customer may then bring the EAS device attached to each merchandise to the EAS Unlock Device, such that the EAS Disengagement subsystem may be configured to detect the RFID embedded in each EAS device. The EAS Unlock Device may be configured to check for merchandise information in the third-party database and/or associated retailer database using the extracted RFID code. As described previously, the merchandise information may include, but is not limited to, merchandise price, merchandise stock levels, merchandise size, payment instructions, payment status and the like. Upon identifying the merchandise in the third-party database and/or associated retailer database, the EAS Unlock Device may be configured to send the information to the computing device to record the purchase and generate a purchase record. Upon purchase recording completion, the EAS Unlock Device may unlock the EAS device associated with each merchandise.

The customer may repeat the aforementioned unlock process until he or she has completed the entire purchase. Upon which, the customer may indicate to the computing device that the purchase has been completed or the customer may directly leave the detection range or area of the system of sensors. Once the computing device and/or at least one sensor detects that the customer has completed the transaction or left the detection range or area of the system of sensors, the computing device may immediate begin to process payment based at least on the purchase record. Successful payment processing may conclude the transaction.

If payment processing of the purchase record has failed, the system of alarms may be triggered to alarm relevant retail staff to take additional action on the failed transaction processing.

Alternatively, following the customer's entering of payment information into the computing device and the activation of EAS Unlock Device, the customer may then bring the EAS device attached to each merchandise to the EAS Unlock Device, such that the EAS Disengagement subsystem may be configured to detect the RFID embedded in each EAS device. The EAS Unlock Device may be configured to check for merchandise information in the third-party database and/or associated retailer database using the extracted RFID code. Upon identifying the merchandise in the third-party database and/or associated retailer database, the EAS Unlock Device may be configured to send the information to the computing device to directly process the payment for the merchandise. Upon purchase recording completion, the EAS Unlock Device may unlock the EAS device associated with the merchandise. This action may be repeated by the customer until the customer has completed purchase for all selected merchandise.

The aspects described herein with respect to FIGS. 1 to 8, are for illustrative purposes and are subject to many variations. It is understood that various omissions and substitutions of equivalents are contemplated as circumstances may suggest or render expedient, but are intended to cover the application or implementation without departing from the spirit or scope of the present disclosure. Further, it is to be understood that the phraseology and terminology employed herein are for the purpose of the description and should not be regarded as limiting. Any heading utilized within this description is for convenience only and has no legal or limiting effect. The terms "a" and "an" herein do not denote a limitation of quantity, but rather denote the presence of at least one of the referenced item.

Figure 1:
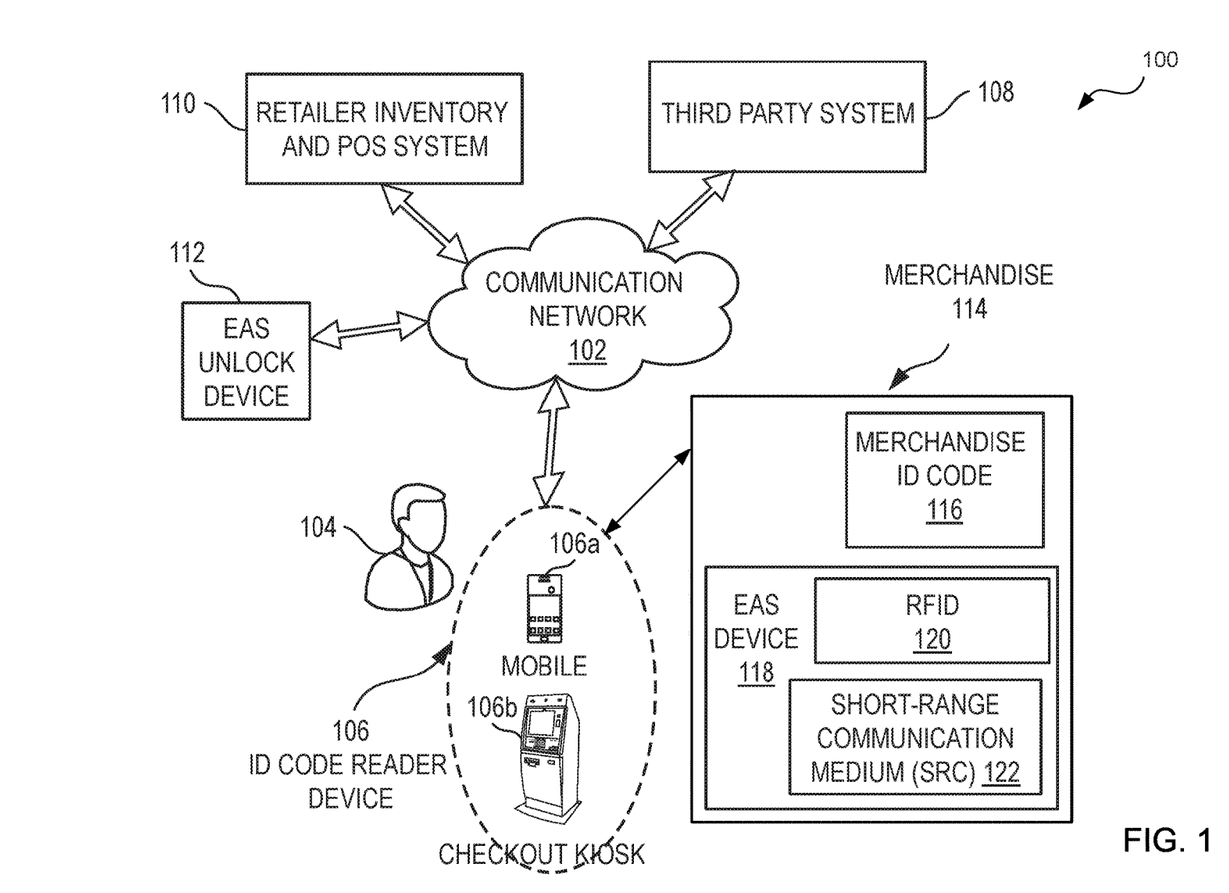
FIG. 1 illustrates an exemplary self-checkout and anti-theft system, in accordance with aspects of the present disclosure.

FIG. 1 illustrates an exemplary environment 100, in accordance with an aspect of the present disclosure. The environment 100 may include a communication network 102 that enables a user 104 to do self-checkout of selected item(s) (e.g., merchandise 114) while shopping in a retail store. A self-checkout may be executed using identification code reader device 106, a third party system 108, a retailer inventory and point of sale (POS) system 110, and an EAS Unlock Device 112. In one aspect, the communication network 102 may be a wired communication network. Alternatively, the communication network 102 may be a wireless communication network.

The user 104, while shopping in a retail store, may select the merchandise 114 for purchase. The merchandise 114 may be associated with a merchandise ID code 116, and RFID code 120 and SRC code 122 within the EAS device 118. Examples of merchandise ID code 116 and SRC code 122 may include, but are not limited to, bar code, QR code, numeric code, alphanumeric code, or any other two-dimensional (2D) image code or three-dimensional (3D) image code. In one aspect, the merchandise ID code 116 may be associated or bound with the RFID code 120 and/or SRC code 122 in the EAS device 118, which will be explained in detail in conjunction with FIGS. 2A and 2B.

The merchandise ID code 116, RFID code 120 or SRC code 122 may be read and detected by using any of the ID Code Reader Device 106. Examples of the ID Code Reader Device 106 may include, but is not limited to, a mobile device 106a, a checkout kiosk 106b installed in a store, or any other electronic communication device that may be capable of reading the merchandise ID code 116, RFID code 120 or SRC code 122. For the sake of clarity and for the purpose of this description, only two ID Code Reader Devices are shown in the environment 100, but it should be noted that any number of such or other electronic communication devices can be used in the store that are capable of reading the merchandise ID code 116, RFID code 120 or SRC code 122.

A first set of information associated with the selected merchandise 114 may then be extracted from a database based on the merchandise ID code 116, RFID code 120 or SRC code 122. The database may be associated with the third party system 108 and/or the retailer inventory and POS system 110. In an aspect, the database may include an inventory associated with the merchandise 114. The inventory in the database may contain information such as the merchandise ID code 116, RFID code 120 and/or SRC code 122 associated with the merchandise 114. The inventory may also include a plurality of merchandise information along with the merchandise ID code 116, RFID code 120 and/or SRC code 122. The merchandise information may include, but is not limited to, merchandise price, merchandise stock, stock keeping unit (SKU) number, merchandise size, payment instructions, payment status and the like.

Further, the extracted first set of information associated with the merchandise 114 may be displayed at an electronic device for user's review. In an aspect, the electronic device on which the first set of information is displayed may include the ID Code Reader Device 106. For example, the first set of information may be displayed on a mobile device 106a or a checkout kiosk 106b. In another aspect, the first set of information may be displayed at an electronic device other than the ID Code Reader Device 106. For example, the merchandise ID code 116, RFID code 120 or SRC code 122 may be read by the checkout kiosk 106b but the first set of information associated with the merchandise 114 may be displayed for the user 104 at any other electronic device connected with the communication network 102. Extracting and displaying the first set of information associated with the merchandise 114 will be explained in detail in conjunction with FIG. 4 and FIG. 5.

The displayed first set of information associated with the merchandise 114 may then be reviewed by the user 104. Thereafter, the user 104 may decide to purchase the merchandise 114 by paying for the merchandise 114 through a payment system. Once the payment is successfully processed, the payment status of the merchandise 114 may be updated in the retailer inventory and POS system 110 or the third party system 108. For example, if the payment transaction is successful, the payment status of the merchandise 114 may be marked as "Payment Received," "Item Purchased," "Sold," "Payment Success" or any other word/phrase/number that represent the merchandise 114 as sold.

Thereafter, the merchandise ID code 116, RFID code 120 or SRC code 122 associated with the merchandise 114 may be retrieved when the merchandise 114 and EAS device 118 are brought near the EAS Unlock Device 112. In an aspect, the payment status of the merchandise 114 may be extracted by the EAS Unlock Device 112 from the retailer inventory and POS system 110 or third party system 108 based on the RFID code 120 of the merchandise 114. The EAS Unlock Device 112 may unlock the EAS device 118 if the transaction for the payment (payment status) corresponding to the RFID code 120 is successful. It should be noted that the EAS Unlock Device 112 may use any suitable unlock mechanism to unlock the EAS device 118.

Figure 2A:
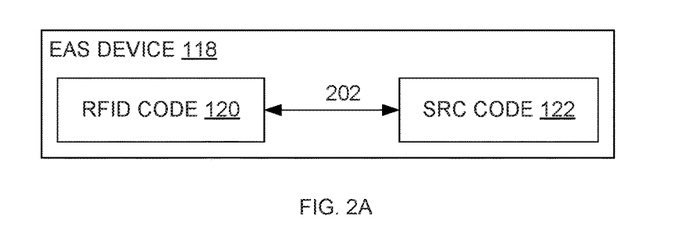
FIG. 2A illustrates the binding between the RFID code and the SRC code both embedded in the EAS device, in accordance with aspects of the present disclosure.

FIG. 2A illustrates an integration of a merchandise ID code 116 with a RFID code 120 or SRC code 122, in accordance with an example aspect of the present disclosure. As discussed above, the merchandise in a retail store may be associated with the merchandise ID code 116, the RFID code 120 and the SRC code 122. For example, as shown in FIG. 1, the merchandise 114 may be associated with the merchandise ID code 116 and a RFID code 120 and/or SRC code 122. Examples of the merchandise ID code 116 and SRC code 122 may include, but are not limited to, a bar code, QR Code, numeric code, alphanumeric code, NFC code, or any other 2D or 3D image code. Examples of the RFID code 120 may include, but are not limited to, a Unique Identity (UID) of a RFID tag, a RFID number of the RFID tag, and etc. The RFID code 120 and SRC code 122 are disclosed herein for the sake of clarity and explanation and they do not limit the invention to only RFID code, and a person skilled in the art may use any other type of ID and associate it with the merchandise 114. As shown in FIG. 2A, in operation 202, the RFID code 120 and the SRC code 122 may be associated or bound with each other and stored in a database of the retailer inventory and POS system 110 or the third party system 108.

Figure 2B:
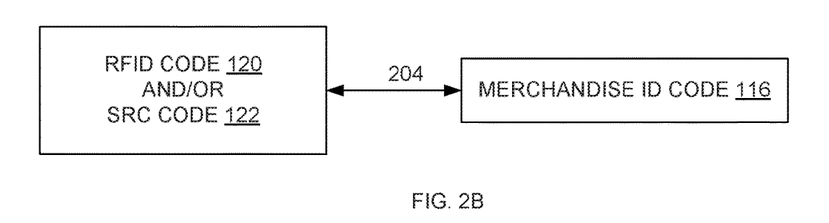
FIG. 2B illustrates the binding between the RFID code or SRC code in the EAS device and the merchandise ID code associated with the merchandise, in accordance with aspects of the present disclosure.

Referring to FIG. 2B, in operation 204, the merchandise ID code 116 and the RFID code 120 and/or the SRC code 122 may be associated or bound with each other and stored in a database of the retailer inventory and POS system 110 or the third party system 108. In an aspect, the merchandise ID code 116, the RFID code 120 and SRC code 122 may be stored in the database along with other merchandise information such as the SKU, payment status, stock, size, price, and the like. An exemplary non-limiting representation of storage in a database is depicted in FIG. 3B. By associating and binding the merchandise ID code 116 with the RFID code 120 and/or the SRC code 122, any one of the IDs may be used to extract information of the merchandise 114 from either a database of the retailer inventory and POS system 110, or a database of the third party system 108. Additionally, the merchandise ID code 116 may also be used to update the payment status of the merchandise 114 in the database when the merchandise price has been paid by the user 104 through the payment system.

Similarly, the RFID code 120 may be used by the retailer inventory and POS system 110 or the third party system to extract the payment status of the merchandise 114 from its database when the merchandise 114 is brought near the EAS Unlock Device 112. The RFID is a technology that uses radio waves to identify merchandise details to which an RFID tag is associated with. In an exemplary aspect, the RFID tag may transmit data when it is activated by radio waves from an RFID reader. Post activation, the RFID tag may return the information contained in the RFID tag, for example, the RFID tag may return the RFID code 120 information. The RFID code 120 information may be used to read/extract the merchandise information like payment status, from the database of the retailer inventory and POS system 110 or the third party system 108.

Figure 3A:
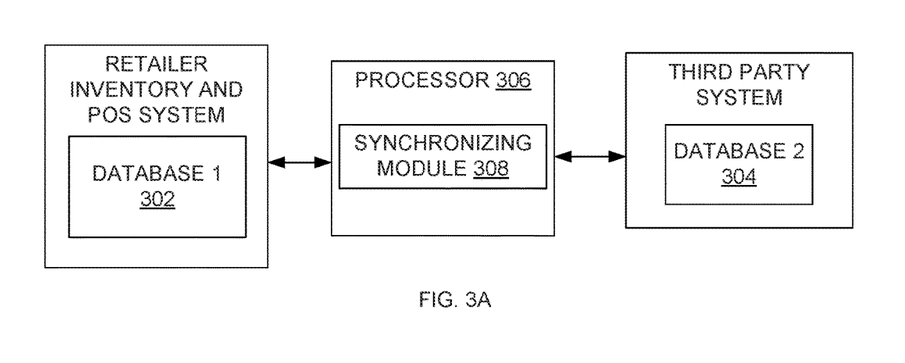
FIG. 3A illustrates an example representation of association between a database in a retailer inventory and POS system and a database in a third party system, in accordance with aspects of the present disclosure.
Figure 3B:
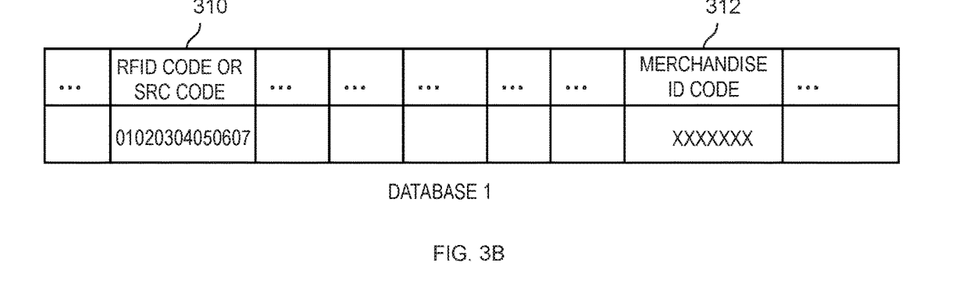
FIG. 3B illustrates an example representation of an inventory in a database, in accordance with aspects of the present disclosure.

FIG. 3A illustrates a representation of association between a database in a retailer inventory and POS system 110 and a database in a third party system 108, in accordance with an example aspect of the present disclosure. Specifically, a database 302 of the retailer inventory and POS system 110 may communicate with a database 304 of the third party system 108 for exchanging and/or updating information associated with the merchandise 114. In an aspect, the complete information associated with the merchandise 114 in the database 302 may be synced with the database 304 periodically or in connection with a selected time interval. In another aspect, a portion of the complete information associated with the merchandise 114 may be extracted from the database 302 and synced with the database 304 periodically or in connection with a selected time interval.

Synchronizing the databases 302 and 304 may include adding, modifying, or deleting one of the records stored in either or both databases. For example, either or both databases 302 and 304 may be a cloud storage system. Cloud storage is a network-based data storage model in which electronic data are stored in logical pools, the physical storage spans multiple servers (and often locations), and the physical environment is typically owned and managed by various cloud storage providers who are responsible for keeping the data available and accessible, and the physical environment protected and running. Individual users, enterprises, and organizations buy or lease storage capacity from these storage providers to store user, organization, or application data. As shown in FIG. 3A, a processor 306 may be configured to execute at least one synchronizing module 308 for synchronizing and sharing data objects and information between cloud-based databases 302 and 304 and/or other computing devices connected in a same network. The processor 306 may be part of either the database 302 or 304. Alternatively, the processor 306 may be implemented via a separate server system associated with a remote service cloud in processing data from various computing devices including databases 302 and 304 in real time. In an aspect, databases 302 and 304 may store data on a cloud-based server by sending Hypertext Transfer Protocol (HTTP)-based web-oriented operations to the server for storing, retrieving, or modifying application data associated with various data objects. The cloud server, via e.g., the processor 306, may translate these operations into database operations, such as operations on a relational database. These operations may include constraints that are mapped to database constraints. For example, various web operations reflecting updated information associated with the merchandise 114 may be obtained by the processor 306 of, e.g., a cloud service server from either databases 302 or 304 via an application programming interface (API) (not shown). The processor 306 may execute the synchronizing module 308 to translate the operations into database operations. For example, a "Get" web operation may be mapped to a select data storage operation. A "Move" web operation may be mapped to a delete operation and an update operation. An "Insert" or "Update" operation may be mapped to a select operation and an insert operation. That is, either or both databases 302 and 304 may be configured to carry out at least a delete operation (reducing the inventory) and an update operation as a result of a successful payment of the merchandise 114 by a customer.

FIG. 3B illustrates a representation of an inventory in a database, in accordance with an example aspect of the present disclosure. Merchandise information in the database 302 may be shown in a tabular fashion, or in any other suitable format. The database 302 may include the RFID code 120 or the SRC code 122 and the merchandise ID code 116 in data field 306 and data field 308 respectively within the database 302. The database 302 may also include different information associated with the merchandise 114 in different data fields. For example, SKU, stock availability, payment status, size, merchandise color and etc. may also be stored in the database 302 corresponding to the RFID code 120 or SRC code 122 included in the data field 306 and the merchandise ID code 116 included in the data field 308.

Figure 4:
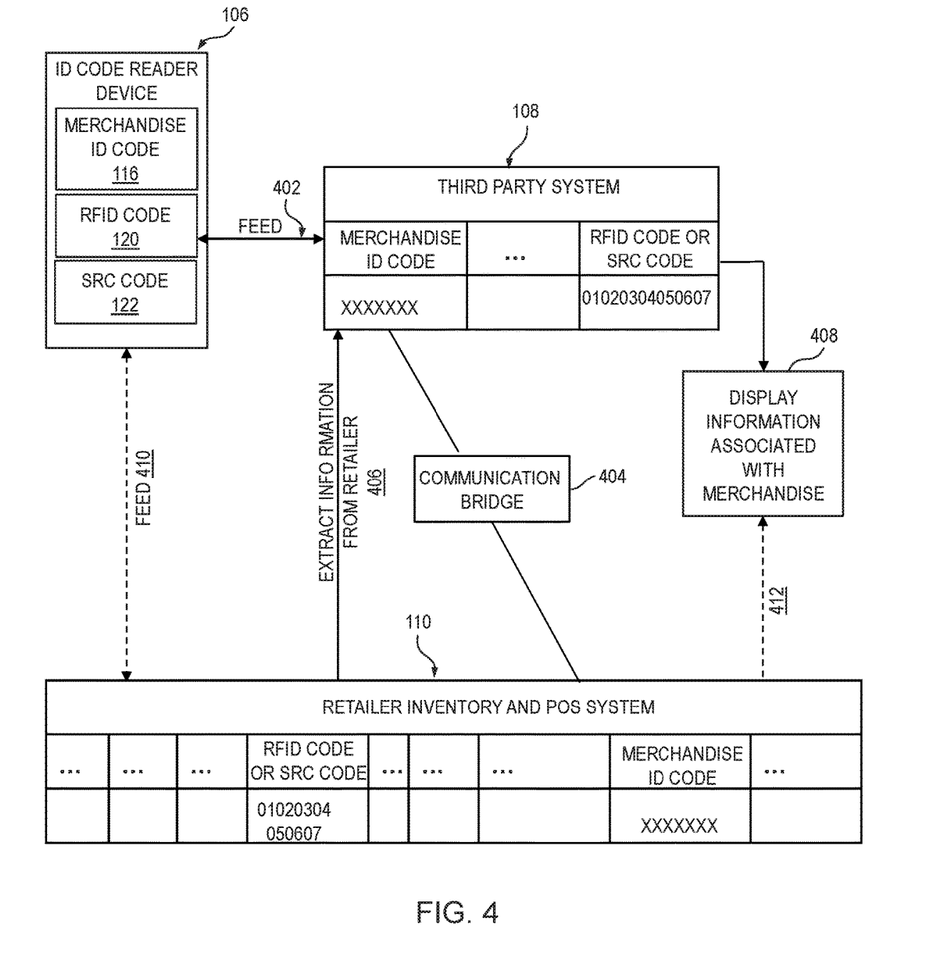
FIG. 4 illustrates how to retrieve and display information associated with the merchandise, in accordance with aspects of the present disclosure.

FIG. 4 illustrates how to retrieve and display information associated with the merchandise, in accordance with an example aspect of the present disclosure. Initially, the ID Code Reader Device 106 may read the merchandise ID code 116, RFID code 120 or SRC code 122. The RFID code 120 and the SRC code 122 may be read and matched to the merchandise ID code 116 in database 302 of the retailer inventory and POS system 110 or database 304 of the third party system 108 after the information is read by the ID Code Reader Device 106. At operation 402, the read ID code may be received by the third party system 108 and matched to the merchandise ID code 116 to extract information associated with the merchandise 114. The third party system 108 may then extract information from the retailer inventory and POS system 110 based on the merchandise ID code 116. In an aspect, the third party system 108 and the retailer inventory and POS system 110 may be connected with each other through a communication bridge 404. The merchandise ID code 116 received from the third party system 108 may be used to search for corresponding information in the database (e.g., the database 302) of the retailer inventory and POS system 110. Thereafter, the information associated with the merchandise 114 may be identified from the retailer inventory and POS system 110 based on the merchandise ID code 116.

At operation 406, the third party system 108 may extract a first set of information associated with the merchandise 114 from the retailer inventory and POS system 110. At operation 408, the first set of information associated with the merchandise 114 may be displayed to the user 104 on an electronic device by the third party system 108. In an aspect, the information associated with the merchandise 114 may be directly and solely extracted from the retailer inventory and POS system 110. For example, at operation 410, the merchandise ID code 116 may be directly used to lookup for information corresponding to the merchandise 114 in the database 302. Thereafter, information associated with the merchandise 114 may be obtained based on the merchandise ID code 116. At operation 412, the obtained information of the merchandise 114 may then be displayed for the user 104 at the electronic device by the retailer inventory and POS system 110.

Figure 5:
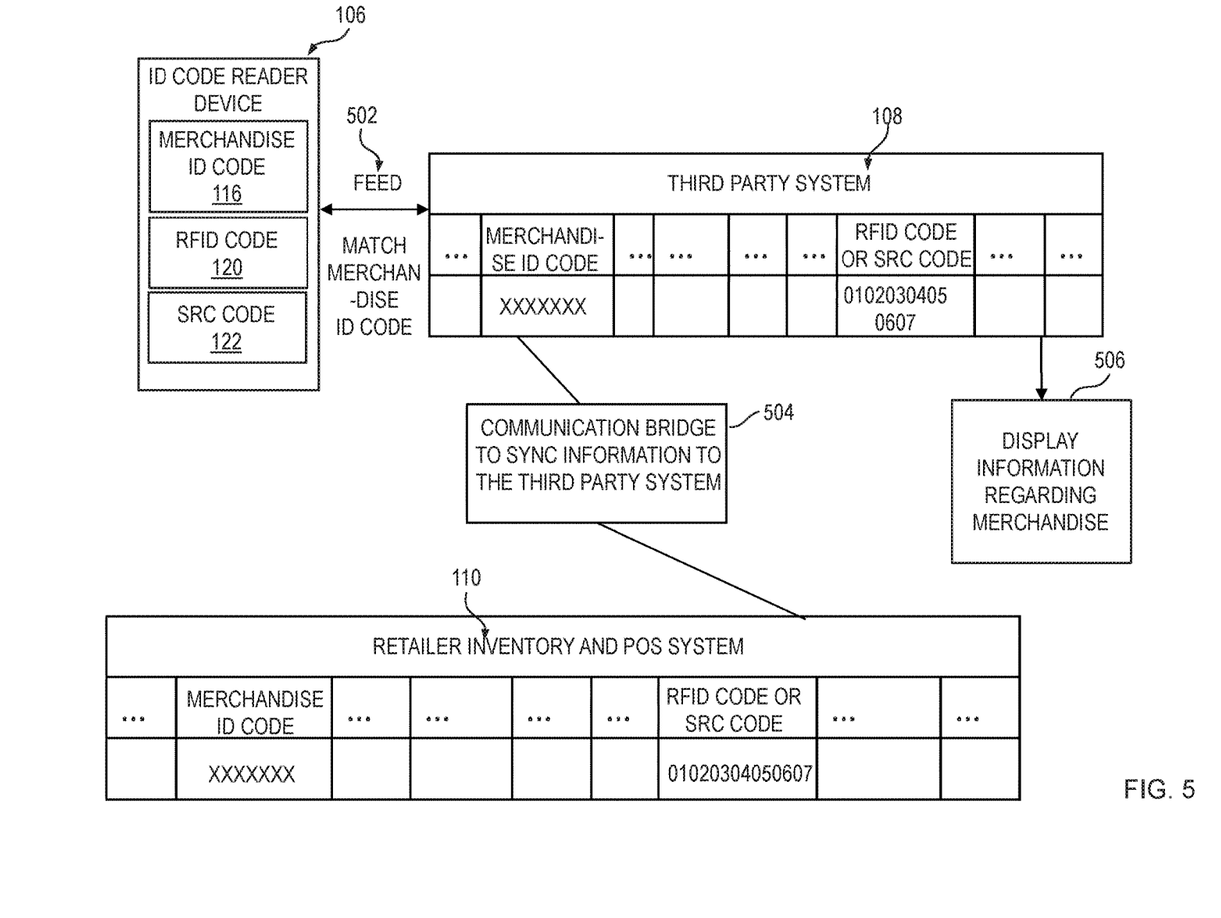
FIG. 5 illustrates how to retrieve and display information associated with the merchandise, in accordance with aspects of the present disclosure.

FIG. 5 illustrates how to retrieve and display information associated with the merchandise 114, in accordance with another example aspect of the present disclosure. Initially, the ID Code Reader Device 106 may read the merchandise ID code 116 or the already-bounded RFID code 120 and/or SRC code 122. At operation 502, the read ID code may be transmitted to the third party system 108 and matched to the merchandise ID code 116 to lookup information associated with the merchandise 114 in a database (e.g., the database 304) of the third party system 108.

At operation 504, the database 304 of the third party system 108 may be synced with the database 302 of the retailer inventory and POS system 110. As a result, the database 304 of the third party system 108 may keep a record of entire merchandise information by syncing merchandise information with the database 302 of the retailer inventory and POS system 110. In an example, all of the information associated with the merchandise 114 may be synced between the database 304 of the third party system 108 and the database 302 of the retailer inventory and POS system 110 through a communication bridge. As a result, both of the third party system 108 and the retailer inventory and POS system 110 may include the entire information about the merchandise 114. The information about the merchandise 114 includes, but is not limited to the RFID code 120 and SRC code 122 associated with the merchandise 114, merchandise ID code 116, SKU, size, color, price, payment status, stock, and etc.

The RFID code 120 and the SRC code 122 may be read and matched to the merchandise ID code 116 in database 302 of the retailer inventory and POS system 110 or database 304 of the third party system 108 after the information is read by the ID Code Reader Device 106. When the merchandise ID code 116 is received by the third party system 108, the information associated with the merchandise 114 may be looked up in the database 304 of the third party system 108 using the merchandise ID code 116. At operation 506, information associated with the merchandise 114 may be extracted based on the merchandise ID code 116 and is thereafter displayed for the user 104 on an electronic device by the third party system 108.

Figure 6:
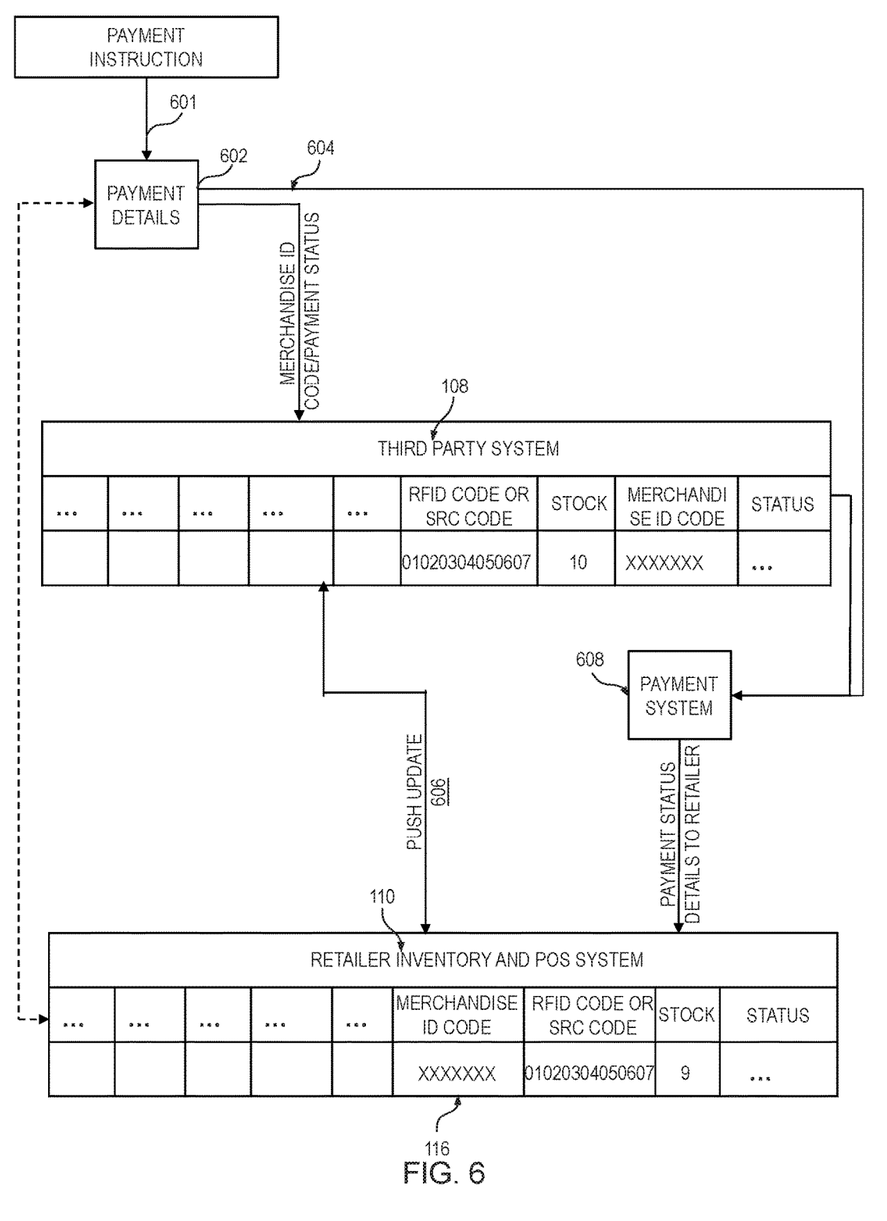
FIG. 6 illustrates how to update payment status of the merchandise in the database, in accordance with aspects of the present disclosure.

FIG. 6 illustrates how to update payment status of the merchandise in databases, in accordance with an example aspect of the present disclosure. In an aspect, payment status of the merchandise 114 may be updated in the retailer inventory and POS system 110 after a successful payment transaction. At operation 601, in response to receiving payment instructions, payment details 602 may be sent to a payment system 608 (e.g., operation 604). Upon detecting a successful payment transaction, the payment system 608 may send the purchase amount to a retailer and also update the database 302 of the retailer inventory and POS system 110. For example, if the payment is successful, the merchandise stock may be adjusted accordingly and the payment status in the database 302 of the retailer inventory and POS system 110 may also be updated accordingly.

In an aspect, the payment details may also be sent using the third party system 108. At operation 606, the databases of the third party system 108 and the retailer inventory and POS system 110 may be updated. The updates may be pushed between the database 304 of the third party system 108 and the database 302 of the retailer inventory and POS system 110 at regular intervals or whenever any update is recorded in any databases. It should be noted that the payment method and payment status update method explained in the aforementioned description is exemplary and it nowhere limits the disclosure to the said flow or method. Hence, a person skilled in the art can use different payment methods and payment status update method.

Figure 7:
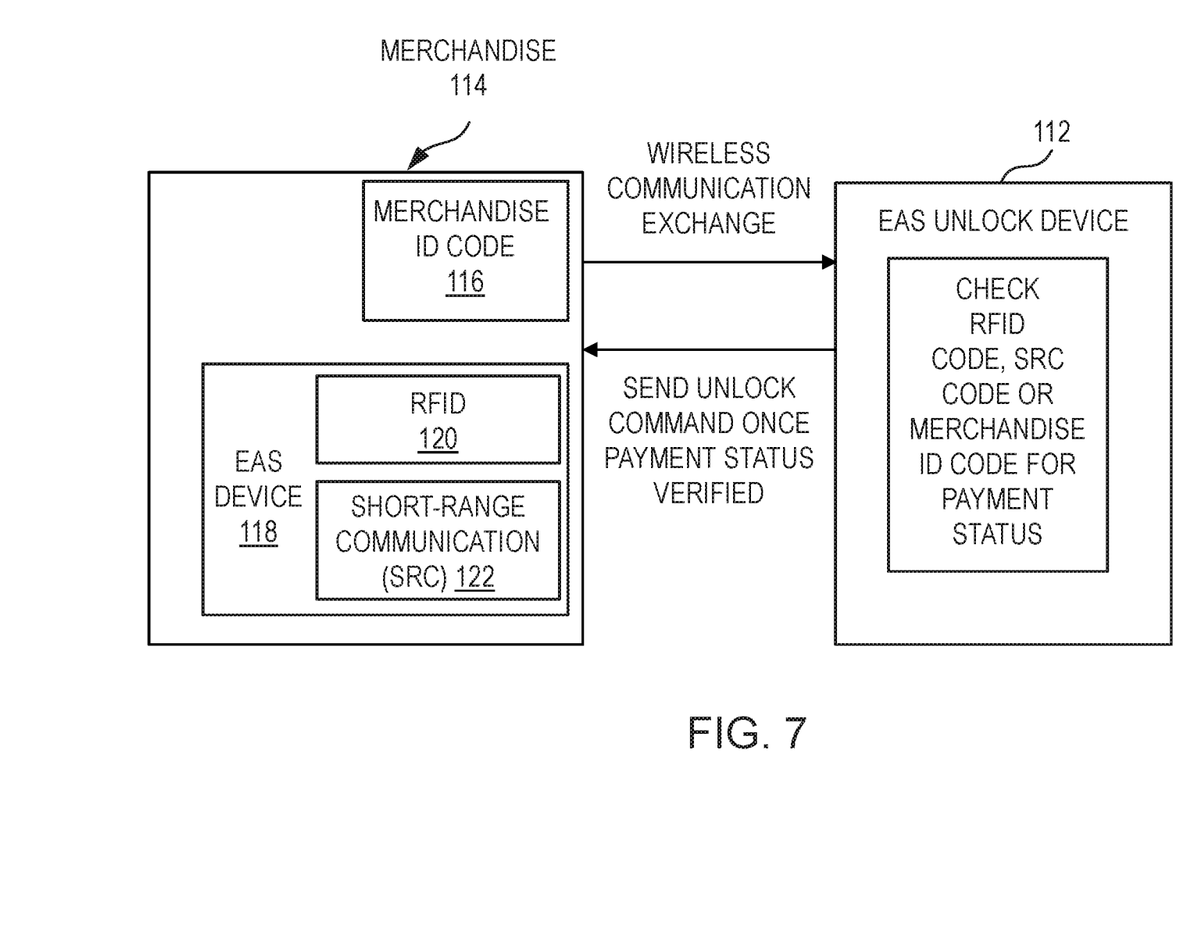
FIG. 7 illustrates how to unlock an EAS device associated with the merchandise, in accordance with aspects of the present disclosure.

FIG. 7 illustrates how to unlock an EAS device associated with the merchandise, in accordance with an example aspect of the present disclosure. The user 104, after a successful payment transaction, may bring the merchandise 114 near the EAS Unlock Device 112. When the EAS device 118 attached to the merchandise 114 is brought near the EAS Unlock Device 112, the RFID code 120 or SRC code 122 inside the EAS device 118 may be identified and/or extracted through a reader embedded in the EAS Unlock Device 112. The RFID code 120 or SRC code 122 may then be used to extract payment status of the merchandise 114 from the database 302. Subsequently, the payment status of the merchandise 114 may be identified by the EAS Unlock Device 112. If merchandise 114 has already been paid for, EAS Unlock Device 112 may send an unlock command, in wireless or physical signal form, to the EAS device 118 to trigger the EAS device to unlock.

Figure 8:
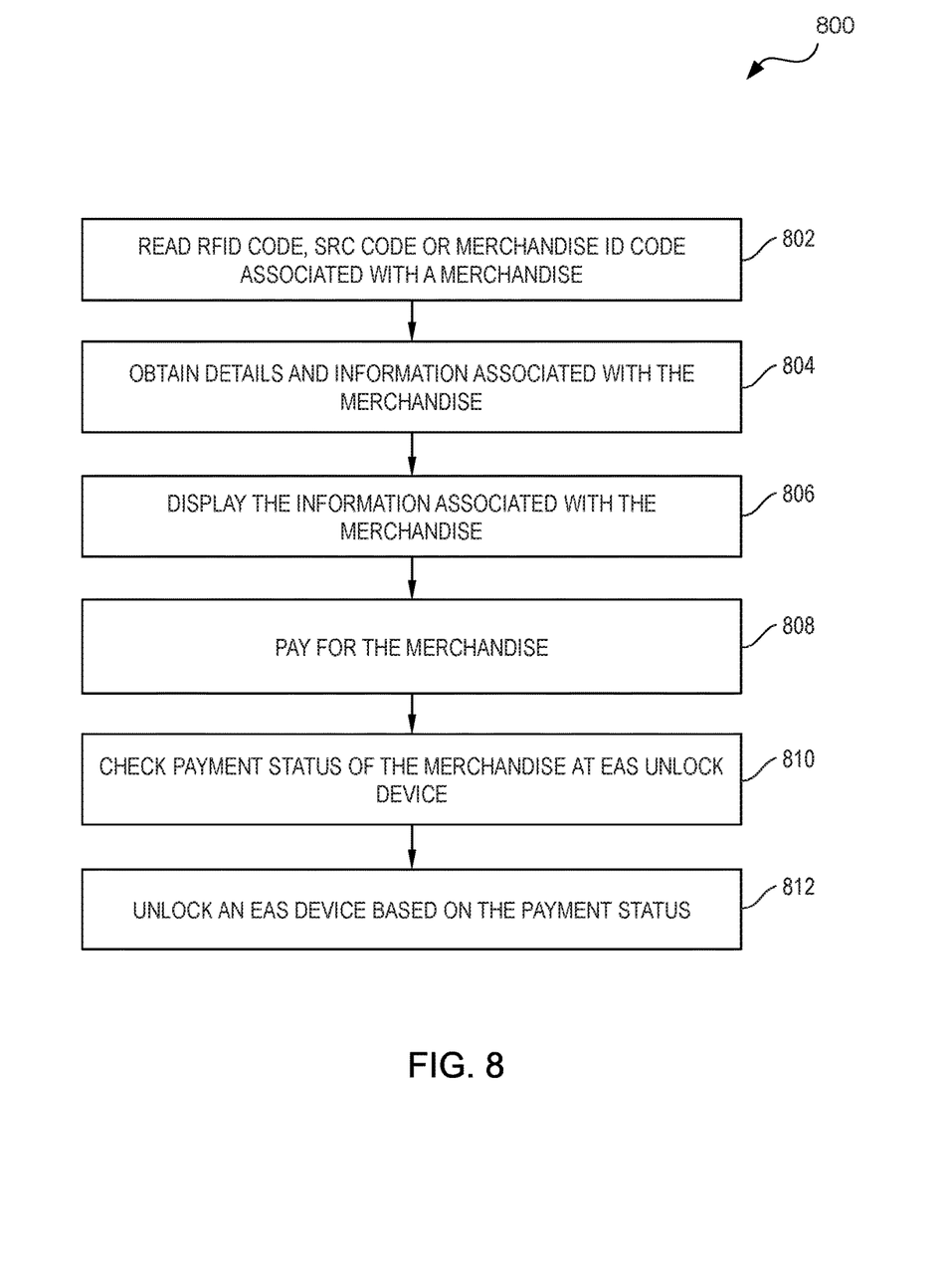
FIG. 8 illustrates a flow diagram including a method to enable a user to perform self-checkout of merchandise, in accordance with aspects of the present disclosure.

FIG. 8 illustrates a flow diagram including a method 800 to enable a user to perform self-checkout of a merchandise, in accordance with an example aspect of the present disclosure. At operation 802, the method 800 reads the merchandise ID code 116, RFID code 120 or SRC code 122 associated with the merchandise 114 using the ID Code Reader Device 106. At operation 804, the method 800 obtains details and information associated with the merchandise 114 from the retailer inventory and POS system 110 and/or the third party system 108. Obtaining information from the retailer inventory and POS system 110 and/or the third party system 108 is explained in detail in conjunction with FIG. 4 and FIG. 5.

At operation 806, the obtained information may be displayed on an electronic device. In an aspect, the information may be displayed on the ID Code Reader Device 106. In another aspect, the information may be displayed on any other electronic communication device. At operation 808, payment for the merchandise 114 may be done using a payment system (e.g., the payment system 608). After the successful payment for the merchandise 114, the method 800 updates the payment status in the inventory/database of the retailer inventory or POS system 110 and/or the third party system 108. For example, the payment status may be updated in the database 302 and/or the database 304.

At operation 810, the method 800 receives RFID code 120 or SRC code 122 of the merchandise 114 during checkout and checks the payment status of the merchandise 114 in the database 302. In an aspect, the RFID code 120 may be detected at the EAS Unlock Device 112 and the payment status of the merchandise 114 may be checked in the database 302 of the retailer inventory and POS system 110. At operation 812, the method 800 unlocks an EAS device (e.g., the EAS device 118) associated with the merchandise 114 based on the corresponding payment status of the RFID code 120. The EAS device 118 of the merchandise 114 is unlocked at the EAS Unlock Device 112 if the payment status of the merchandise 114 is marked as paid in the database 302.

Figure 9:
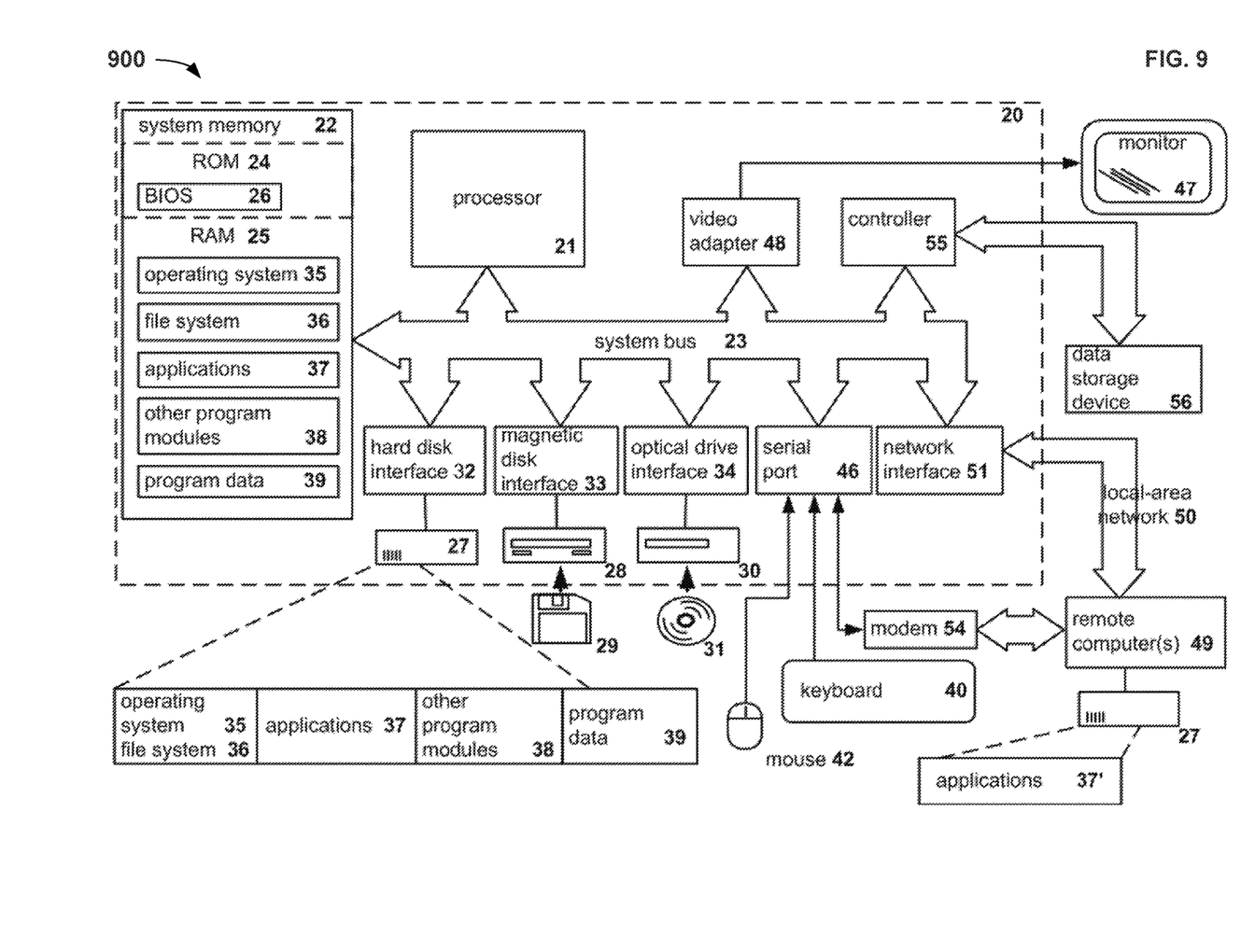
FIG. 9 illustrates an example computer system through which the disclosed aspects of the systems and methods may be implemented.

Various aspects of the present disclosure (explained in conjunction with FIGS. 1-8) provide self-checkout systems anti-theft technology and methods, and these aspects of the self-checkout systems with anti-theft technology are capable of allowing customers to conduct self-checkout of purchased items, thereby reducing checkout time while preventing theft. FIG. 9 illustrates an example computer system or computing device 900 (e.g., the EAS device 118, ID Code Reader Device 106, EAS Unlock Device 112, retailer inventory and POS system 110, and a third party system 108) on which the disclosed systems and method may be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an visually drive 30 for reading and writing on removable visually disks 31, such as CD-ROM, DVD-ROM and other visually information media. The hard disk 27, the magnetic disk drive 28, and the visually drive 30 are connected to the system bus 23 across the hard disk interface 32, the magnetic disk interface 33 and the visually drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable visually disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers)

49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or visually storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a user computer or computing device (such as the synchronizing module 308 described in greater detail in FIG. 3A above). Accordingly, each module can be realized in a variety of suitable configurations, and should not be limited to any particular implementation exemplified herein.

For clarity purposes, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for self-checkout with anti-theft measures, comprising:
    an Electronic Article Surveillance (EAS) device configured to be affixed to a merchandise and uniquely identify the merchandise via at least one visually or wirelessly readable code;
    an Identification (ID) Code Reader configured to: obtain and process the at least one visually or wirelessly readable code associated with the EAS device, and extract information from one or more databases for facilitating a transaction of the merchandise; and
    an EAS Unlock Device configured to:
        detect a payment status of the merchandise indicated in the one or more databases based at least upon the at least one visually or wirelessly readable code associated with the EAS device, and
        in response to detecting a successful payment of the merchandise indicated in the one or more databases, detach the EAS device from the merchandise,
    wherein the EAS Unlock Device comprises:
        a barcode/Quick Response (QR) code reader or an Radio Frequency Identification (RFID) reader configured to identify the at least one visually or wirelessly readable code,
        a computing device configured to: verify the transaction of the merchandise in the one or more databases based at least on the at least one visually or wirelessly readable code, or transmit the at least one visually or wirelessly readable code to another computing device to verify the transaction of the merchandise in the one or more databases based at least on the at least one visually or wirelessly readable code, and
        an unlock device configured to detach the EAS device from the merchandise in response to detecting the successful payment of the merchandise indicated in the one or more databases.

2. The system according to claim 1, wherein the at least one visually or wirelessly readable code comprises at least one of: a Quick Response (QR), a barcode communication code, a near field communication code, and a Radio Frequency Identification (RFID) communication code.

3. The system according to claim 1, wherein the one or more databases comprise at least one of: a retailer merchandise inventory database, and one or multiple third party databases.

4. The system according to claim 1, wherein the ID Code Reader comprises at least one of: a mobile phone, or a computing device including at least one self-checkout kiosk.

5. The system according to claim 1, wherein the at least one visually or wirelessly readable code is configured to be bound to the merchandise for:
  identifying each of a plurality of merchandises with a merchandise identification code in the one or more databases;
  generating and affixing at least one visually or wirelessly readable code on the EAS device affixed to the merchandise; and
  linking the merchandise identification code of the merchandise and at least one visually or wirelessly readable code in the one or more databases.

6. The system according to claim 5, wherein the merchandise identification code comprises a series of alphanumeric code, decodable by software application, configured to track merchandise-related information stored in the one or more databases.

7. The system according to claim 1, wherein each of the ID Code Reader and the EAS Unlock Device is configured to connect with and access the one or more databases to retrieve, update, or modify the payment status of the merchandise in the one or more databases.

8. The system according to claim 1, wherein the payment status of the merchandise is recorded in the one or more databases in response to detecting the successful payment of the merchandise.

9. A method for self-checkout with anti-theft measures, comprising:
  affixing an Electronic Article Surveillance (EAS) device to a merchandise;
  uniquely identifying the merchandise via at least one visually or wirelessly readable code associated with the EAS device;
  obtaining and processing the at least one visually or wirelessly readable code associated with the EAS device by an Identification (ID) Code Reader and extracting information from one or more databases for facilitating a transaction of the merchandise based at least on the at least one visually or wirelessly readable code;
  detecting, by an EAS Unlock Device, a payment status of the merchandise indicated in the one or more databases based at least upon the at least one visually or wirelessly readable code associated with the EAS device; and
  in response to detecting a successful payment of the merchandise indicated in the one or more databases, detaching the EAS device from the merchandise by the EAS Unlock Device via:
    configuring a barcode/Quick Response (QR) code reader or an Radio Frequency Identification (RFID) reader of the EAS Unlock device to identify the at least one visually or wirelessly readable code,
    configuring a computing device of the EAS Unlock device to: verify the transaction of the merchandise in the one or more databases based at least on the at least one visually or wirelessly readable code, or transmit the at least one visually or wirelessly readable code to another computing device to verify the transaction of the merchandise in the one or more databases based at least on the at least one visually or wirelessly readable code, and
    configuring an unlock device of the EAS Unlock device to detach the EAS device from the merchandise in response to detecting the successful payment of the merchandise indicated in the one or more databases.

10. The method according to claim 9, wherein the at least one visually or wireless readable code comprises at least one of: a Quick Response (QR), a barcode communication code, a near field communication code, and a Radio Frequency Identification (RFID) communication code.

11. The method according to claim 9, wherein the one or more databases comprise at least one of: a retailer merchandise inventory database, and one or multiple third party databases.

12. The method according to claim 9, wherein the ID Code Reader comprises at least one of: a mobile phone, or a computing device including at least one self-checkout kiosk.

13. The method according to claim 9, further comprising binding the at least one visually or wirelessly readable code to the merchandise for:
  identifying each of a plurality of merchandises with a merchandise identification code in the one or more databases;
  generating and affixing at least one visually or wirelessly readable code on the EAS device affixed to the merchandise; and
  linking the merchandise identification code of the merchandise and at least one visually or wirelessly readable code in the one or more databases.

14. The method according to claim 13, wherein the merchandise identification code comprises a series of alphanumeric code, decodable by software application, configured to track merchandise-related information stored in the one or more databases.

15. The method according to claim 9, further comprising connecting each of the ID Code Reader and the EAS Unlock Device to the one or more databases for enabling retrieving, updating, or modifying the payment status of the merchandise in the one or more databases.

16. The method according to claim 9, further comprising recording and storing the payment status of the merchandise in the one or more databases in response to detecting the successful payment of the merchandise.

17. A non-transitory computer readable medium storing thereon computer executable instructions for enabling self-checkout with anti-theft measures, the instructions causing at least one computer to:
  uniquely identify a merchandise via at least one visually or wirelessly readable code associated with an Electronic Article Surveillance (EAS) device affixed to a merchandise;
  obtain and process the at least one visually or wirelessly readable code associated with the EAS device to extract information from one or more databases for facilitating a transaction of the merchandise;
  detect a payment status of the merchandise indicated in the one or more databases based at least upon the at least one visually or wirelessly readable code associated with the EAS device; and
  in response to detecting a successful payment of the merchandise indicated in the one or more databases, generate and transmit signals for detaching the EAS device from the merchandise via:
    configuring a barcode/Quick Response (QR) code reader or an Radio Frequency Identification (RFID) reader of an EAS Unlock device to identify the at least one visually or wirelessly readable code,
    configuring a computing device of the EAS Unlock device to: verify the transaction of the merchandise in the one or more databases based at least on the at least one visually or wirelessly readable code, or transmit the at least one visually or wirelessly readable code to another computing device to verify the transaction of the merchandise in the one or more databases based at least on the at least one visually or wirelessly readable code, and configuring an unlock device of the EAS Unlock device to detach the EAS device from the merchandise in response to detecting the successful payment of the merchandise indicated in the one or more databases.

18. The computer readable medium of claim 17, further comprising instructions to cause the at least one computer to bind the at least one visually or wirelessly readable code to the merchandise for:

identifying each of a plurality of merchandises with a merchandise identification code in the one or more databases;

generating and affixing at least one visually or wirelessly readable code on the EAS device affixed to the merchandise; and linking the merchandise identification code of the merchandise and at least one visually or wirelessly readable code in the one or more databases.

\* \* \* \* \*